(12) United States Patent
Munk et al.

(10) Patent No.: US 11,354,203 B2
(45) Date of Patent: Jun. 7, 2022

(54) ERROR CORRECTION IN A REDUNDANT PROCESSING SYSTEM

(71) Applicant: Robert Bosch GmbH, Stuttgart (DE)

(72) Inventors: Peter Munk, Renningen (DE); Rainer Baumgaertner, Pfaffenhofen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/607,467

(22) PCT Filed: Mar. 21, 2018

(86) PCT No.: PCT/EP2018/057115
§ 371 (c)(1),
(2) Date: Oct. 23, 2019

(87) PCT Pub. No.: WO2018/202356
PCT Pub. Date: Nov. 8, 2018

(65) Prior Publication Data
US 2020/0050521 A1 Feb. 13, 2020

(30) Foreign Application Priority Data

May 3, 2017 (DE) .......................... 102017207398.5

(51) Int. Cl.
*G06F 11/16* (2006.01)
*G06F 11/14* (2006.01)
*G06F 11/18* (2006.01)

(52) U.S. Cl.
CPC ...... *G06F 11/1641* (2013.01); *G06F 11/1438* (2013.01); *G06F 11/184* (2013.01); *G06F 11/187* (2013.01)

(58) Field of Classification Search
CPC ............ G06F 11/1641; G06F 11/1438; G06F 11/184; G06F 11/187; G06F 11/181; G06F 2201/83

(Continued)

(56) References Cited

U.S. PATENT DOCUMENTS 5,594,915 A * 1/1997 Atalla ................... G06F 9/5044
712/28
6,263,452 B1 * 7/2001 Jewett ....................... G06F 1/12
714/E11.138

(Continued)

FOREIGN PATENT DOCUMENTS

DE 102005037245 A1 2/2007

OTHER PUBLICATIONS

Wikipedia "booting" page from date Apr. 27, 2017, retrieved using the Way BackMachine from https://web.archive.org/web/20170427195649/https://en.wikipedia.org/wiki/Booting (Year: 2017).*

(Continued)

*Primary Examiner* — Yair Leibovich
(74) *Attorney, Agent, or Firm* — Norton Rose Fulbright US LLP; Gerard Messina (57) ABSTRACT

A processing system encompasses several processing devices and a comparison device. A method for controlling the processing system encompasses: processing of identical information items by the processing devices using associated processing processes; furnishing a characteristic value of each processing process, respectively as a function of the processing that has occurred; and comparing the characteristic values by way of the comparison device and determining a defectively operating processing process on the basis of the comparison. The defectively operating processing process is replaced by a processing process restarted on the same processing device.

7 Claims, 4 Drawing Sheets

(58) Field of Classification Search
USPC .......................................................... 714/11
See application file for complete search history.

(56) References Cited

U.S. PATENT DOCUMENTS

2002/0095617 A1* 7/2002 Norman .................. G06F 3/043
714/10
2010/0224888 A1* 9/2010 Norman .............. G06F 15/8007
257/84

OTHER PUBLICATIONS

International Search Report for PCT/EP2018/057115, dated Jun. 8, 2018.
Tsai T, "Fault Tolerance Via N-Modular Software Redundancy", Fault-Tolerant Computing, Digest of Papers. Twenty-Eighth Annual International Symposium on Munich, Germany, Los Alamitos, CA, USA, IEEE Comput. Soc, US, 1998, pp. 201-206, XP032384996.

* cited by examiner

ERROR CORRECTION IN A REDUNDANT PROCESSING SYSTEM

FIELD OF THE INVENTION

The present invention relates to a redundant processing system having several processing devices. The invention relates in particular to an onboard processing system of a motor vehicle.

BACKGROUND INFORMATION

A safety-critical operation, for example controlling a vehicle, can be carried out by way of several processing devices working in parallel. The same input information is furnished to each processing device, and processing of the information occurs in the same manner. Results from the processing devices can be compared with one another in order to determine whether one of the processing devices is working defectively. This task is usually carried out by an apparatus that is different from the processing devices. A processing device that is determined to be defective can be deactivated so as not to compromise processed information. The processing device can be put back into operation when all the processing devices are restarted. A restart usually occurs between when the vehicle is shut down and when it is put back into service.

Patent document DE 10 2005 037 245 A1 relates to a method and an apparatus for controlling a computer system having at least two execution units.

This procedure has been refined by the fact that several processes can also execute simultaneously on one processing device. As availability requirements become more stringent, the question arises as to the extent to which a detected error can be repaired and the processing system can be restored to a fault-free system state. The defectively operating processing process can be restarted on the basis of a system state or of parameters of another processing process. This usually requires, however, a complete save, with a predetermined frequency of occurrence, of the system state of all processing processes. If the system state is complex, for example if it encompasses input data of a past time range and/or a model for processing the information, a large bandwidth is then necessary in order to transfer the recorded information from one processing system to another. Especially when video data are being processed, so much information can need to be transferred that in the event of a fault, the time required for repairing the processing system can be longer than is tolerable.

An object on which the present invention is based is therefore that of describing an improved technology with which a processing system on which several processing processes are running can be resynchronized in the event of a fault. The invention achieves this object by way of the subject matter of the independent claims. Dependent claims reproduce exemplary embodiments.

SUMMARY OF THE INVENTION

A processing system encompasses several processing devices and a comparison device. A method for controlling the processing system encompasses steps of: processing of identical information items by the processing devices using associated processing processes; furnishing a characteristic value of each processing process, respectively as a function of the processing that has occurred; comparing the characteristic values by way of the comparison device and determining a defectively operating processing process on the basis of the comparison. A defectively operating processing process can be replaced by a processing process restarted on the same processing device.

Instead of transferring from one processing device to another the parameters required for execution of a processing process, it is proposed to start several processing processes concurrently on one processing device. The restarted processing process can be initialized on the basis of the input information items so that, for example, a physical model, an algorithm, or a mathematical filter is sufficiently stabilized for the intended processing. This can require, for example, processing of a predetermined number of epochs (measured data intervals). As soon as the restarted processing process has stabilized, the original processing process that is running on the same processing device can be stopped. The new processing process can thus replace the old one, so that the processing apparatus can furnish information that is processed uninterruptedly.

Several variants of this fundamental procedure are presented here. Obvious variants of these methods, or combinations of features of the methods with one another, are also expressly encompassed by the invention.

In a first variant, a further processing process is periodically restarted on each processing device, and initialized with the input information items. The existing processing processes on all the processing devices are replaced by the further processing processes. In other words, a periodic transition from a running processing process to a restarted processing process can occur on each processing device irrespective of the occurrence of a fault. The further processing process may be started while the original processing process is still running.

As soon as the further processing process has sufficiently stabilized, the transition from the old to the new processing process can occur. For that, the old processing process can be shut down and removed from the processing device.

Periodic restarting of processing processes makes it possible to prevent faults, for example a memory leak, from causing greater damage. In particular, the processing processes can be restarted on the processing devices in a staggered manner, i.e. with a time offset. Faults that relate to the processing of all the processing processes can thereby be decorrelated in time. The probability that a fault will simultaneously affect all the participating processing processes or processing devices can thereby be greatly decreased.

In a second variant, similarly to the first variant, a further processing process is restarted on each processing device and initialized with the input information items. After the determination that one of the processing processes is operating defectively, the processing device on which the defectively operating processing process is running is reset. Alternatively, the processing process can also be terminated, and a new processing process can be started and initialized, without restarting the processing device itself. An operating system executing on the processing device can continue to run. The processing device can then ramp back up into an operation-capable state (system start, reboot), and a processing process can then be restarted on that processing device and can be initialized with the relevant input information items. As soon as initialization is complete, the existing processing processes on the other processing devices can be replaced by the further processing processes. This transition can occur particularly quickly, since the further processing processes are already initialized and can be used immediately.

In a third variant, the processing device on which the defectively operating processing process is running is reset, as has been described above. A processing process is then restarted on that processing device and initialized with input information items. On each of the other processing devices, a further processing process is respectively restarted and likewise initialized with the input information items. The existing processing processes on the other processing devices are then replaced with the further processing processes.

In this variant, new processing processes are started non-cyclically. It is only when a defectively operating processing process has been identified that a copy of the running application is prepared on each of the processing devices not affected by that fault. The switchover from the old to the new processing process can occur simultaneously with the starting of the initialized processing process on the processing device on which the defectively operating processing process was previously executing.

The method can be applied in a variety of environments and with different technologies. In particular, different processing processes can be provided on the processing devices. It may be provided, however, that the processing processes of at least two processing devices are identical. It further may be provided that the processing processes of all the processing devices are identical.

In order to determine which processing process is operating defectively, at least three processing processes may be provided. Also, these may be carried out on processing apparatuses that differ pairwise from one another, so that three processing apparatuses are also required. A processing process can be determined to be operating defectively if its characteristic value differs from the characteristic values of the other processing devices. The characteristic values of the other processing devices are usually in agreement. An output value, an interim result, a combination of a number of parameters (in particular a signature, for example a hash value), a memory snapshot, a parameter set or variable set, or another information item, can be used, for example, as a characteristic value. It may be provided that the characteristic value be determined in such a way that it changes when the processing process changes, for example because of a modified model, a memory error, an unforeseen result, or a technical fault in the region of the underlying processing device. It further may be provided that the characteristic value be determined in such a way that it can be determined easily and, if possible, without greatly stressing the processing device. The characteristic value should advantageously also be small, in order to facilitate transfer to the comparison device and evaluation therein.

A computer program product encompasses a program code arrangement having program code for carrying out the method described above when the computer program product executes on a processing device or is stored on a computer-readable data medium.

Both the method and the aforesaid processing processes can respectively execute on a programmable microcomputer or microprocessor. As will be described in more detail below, a distributed or concurrent (parallel) execution of parts of the method or parts of the processing processes is, in particular, possible. Advantages or features of the method can be transferred to a processing system such as the one described in more detail below, or vice versa.

A processing system encompasses: several processing devices that are configured to process the same input information items respectively using an associated processing process and to furnish a characteristic value as a function of the processing; and a comparison device that is configured to compare the characteristic values and to determine a defectively operating processing process on the basis of the comparison. Each processing device is configured to replace the processing process executing on it with a restarted processing process if the processing process executing on that processing device has been determined to be operating defectively.

Each processing device can encompass, in particular, a programmable microcomputer, a microprocessor, or a processing core of a microprocessor. The comparison device can encompass a further microcomputer, microprocessor, or microcontroller.

It may be provided that at least two of the aforesaid processing devices be of identical construction. It further may be provided that all the processing devices be of identical construction.

The present invention will now be described in further detail with reference to the attached Figures.

DETAILED DESCRIPTION

Figure 1:
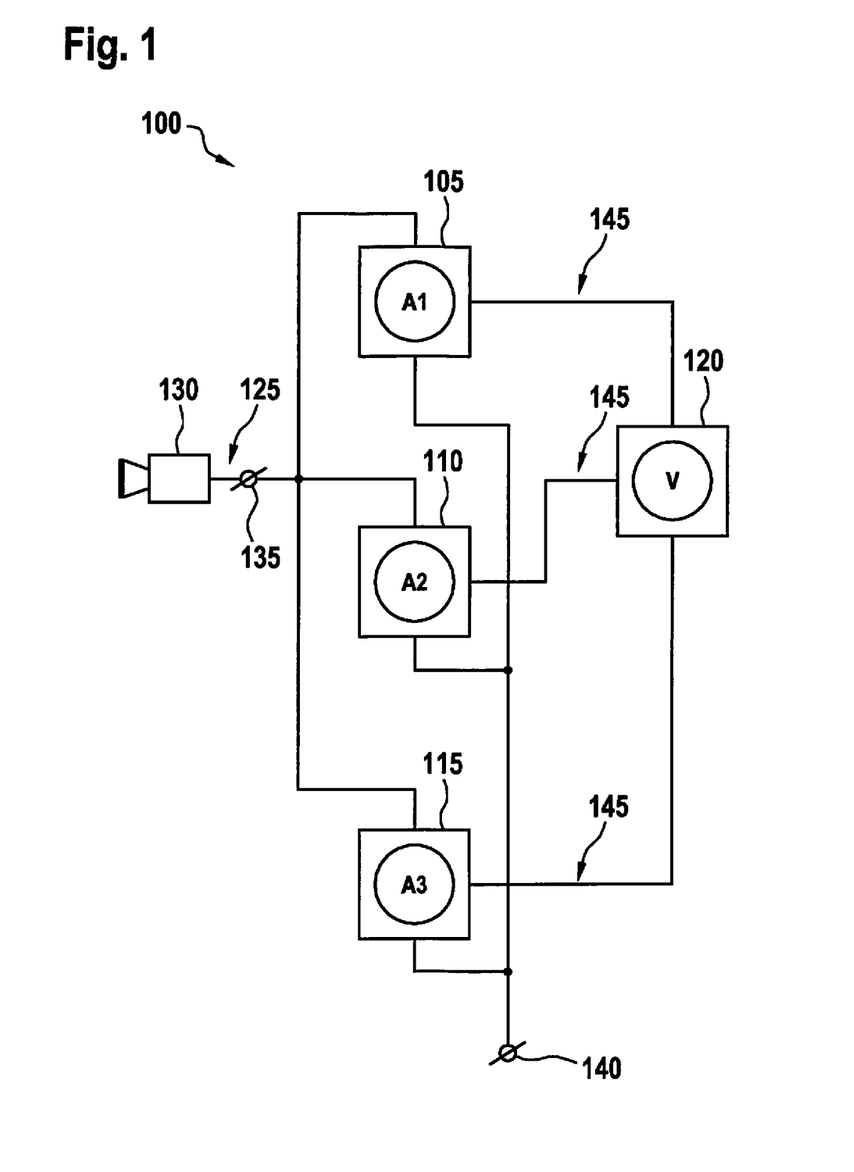
FIG. 1 depicts a processing system.

FIG. 1 shows a processing system 100 that is configured for redundant processing of information items. Processing system 100 can in particular be real-time capable and can be configured, for example, for driver-independent control of a motor vehicle, in particular of a passenger car. In the embodiment depicted by way of example, processing system 100 encompasses a first processing device 105, a second processing device 110, a third processing device 115, and a comparison device 120. In the embodiment depicted here, three processing devices 105 to 115 are provided; in other embodiments, only two or more than three can be used. Each processing device may be constituted by a programmable microcomputer. An associated processing process executes on each processing device 105 to 115. A first processing process A1 is associated with first processing device 105, a second processing process A2 with second processing device 110, and a third processing process A3 with third processing device 115. Comparison device 120 may be embodied as a microcontroller, but can also encompass a microcomputer. In the embodiment depicted, a comparison process V executes on comparison device 120.

Processing system 100 is configured to process input information items 125 that can be furnished, for example, with a predetermined frequency of occurrence, by a video camera 130.

In the present case an input interface 135 is provided through which input information items 125 can be transferred to processing system 100. After the processing of input information items 125 by processing processes A1 to A3 on processing devices 105 to 115, a processing result can be furnished via an output interface 140.

In order to ensure that a defectively operating processing process A1 to A3 does not compromise the data that are being processed, each processing process A1 to A3 or each processing device 105 to 115 furnishes, in an event-controlled manner or periodically, a characteristic value 145 that refers to the respective processing operation. Comparison device 120 or comparison process V compares characteristic values 145 with one another and/or with predetermined values in order to determine whether an anomaly exists in one of processing processes A1 to A3. If this is the case, then that processing device 105 to 115, on which the processing process A1 to A3 has been determined to be operating defectively, is prompted, by way of a signal of comparison device 120, to restart processing process A1 to A3 or to supersede or replace it with a restarted processing process A1 to A3. Different variants for this purpose are proposed, and will be discussed in further detail below with reference to FIGS. 2 to 4. Comparison device V can be configured to control one of processing processes A1 to A3 in the event of an anomaly, in particular with regard to resolution of a fault state, and/or to determine or modify a processing result of processing processes A1 to A3, in particular on the basis of a majority decision.

Figure 2:
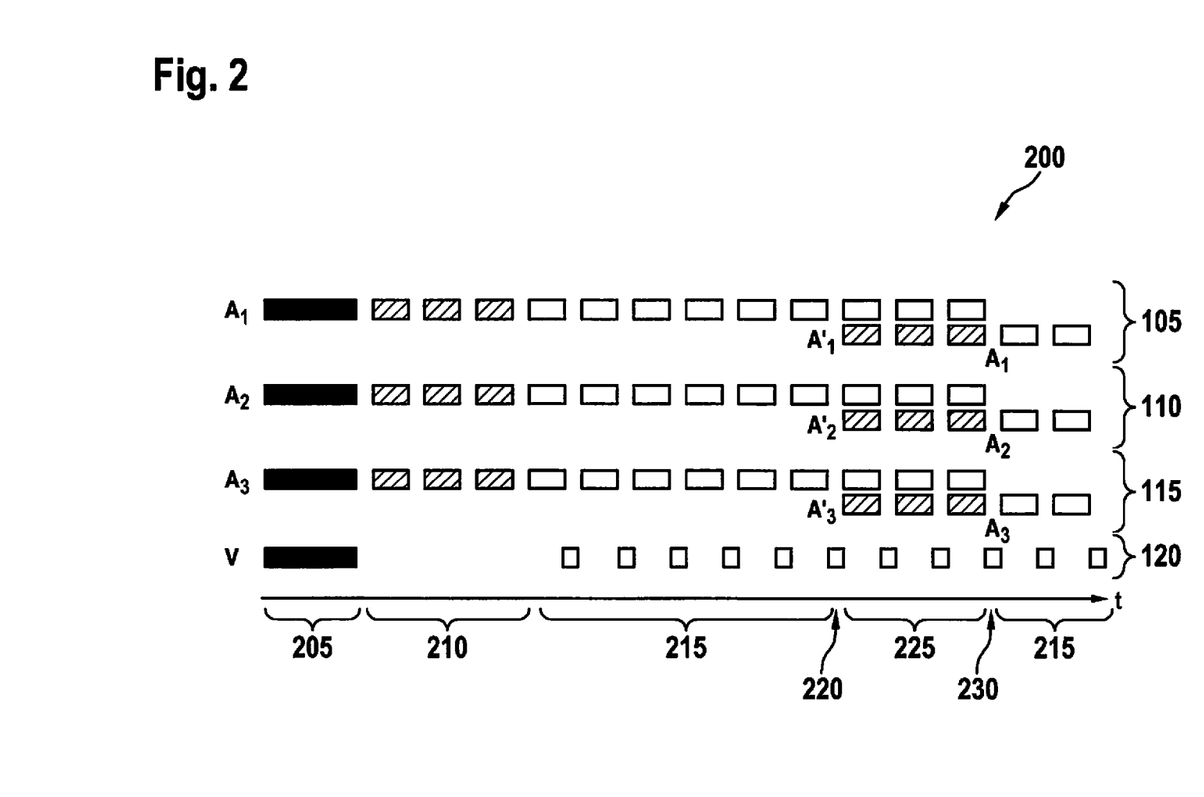
FIG. 2 is an execution diagram of a first method.
Figure 3:
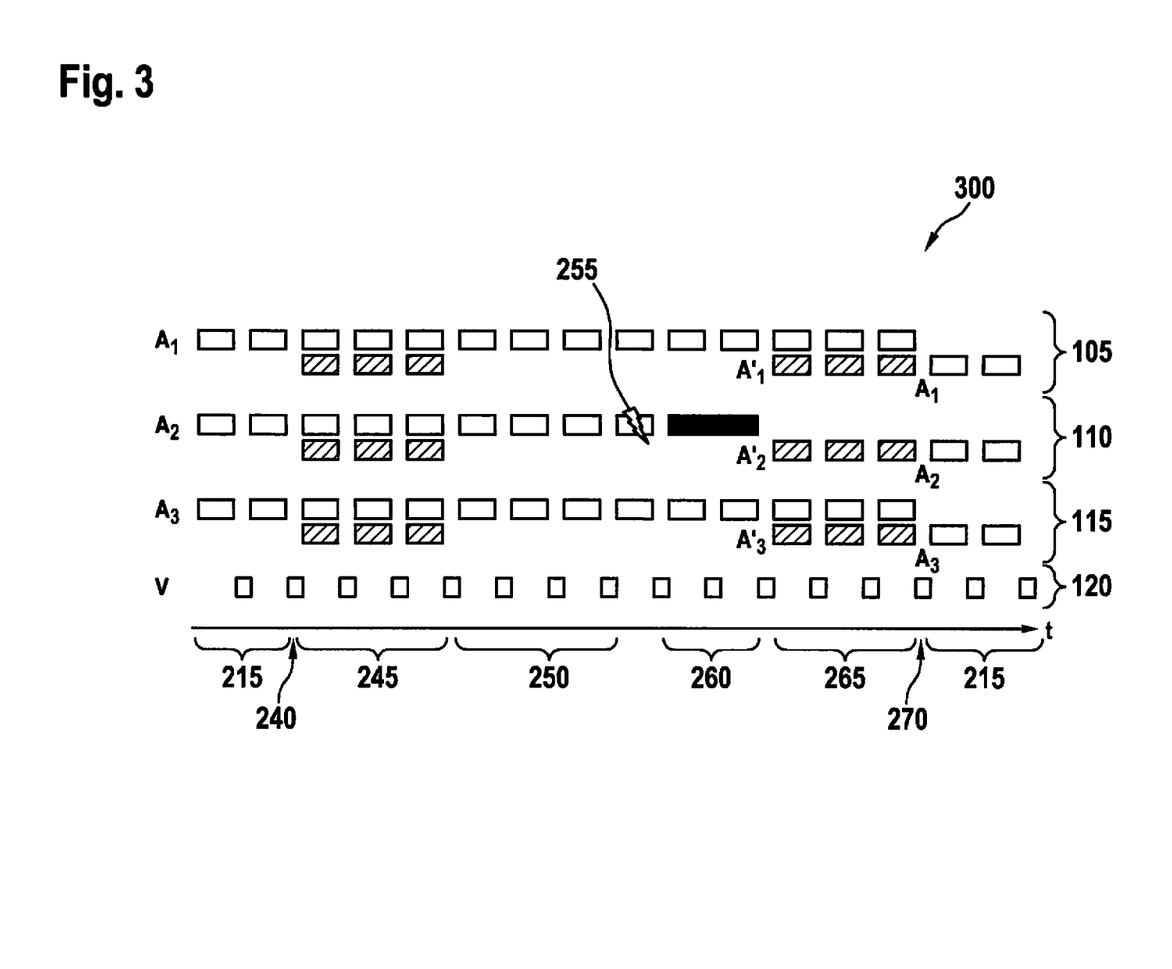
FIG. 3 is an execution diagram of a second method.
Figure 4:
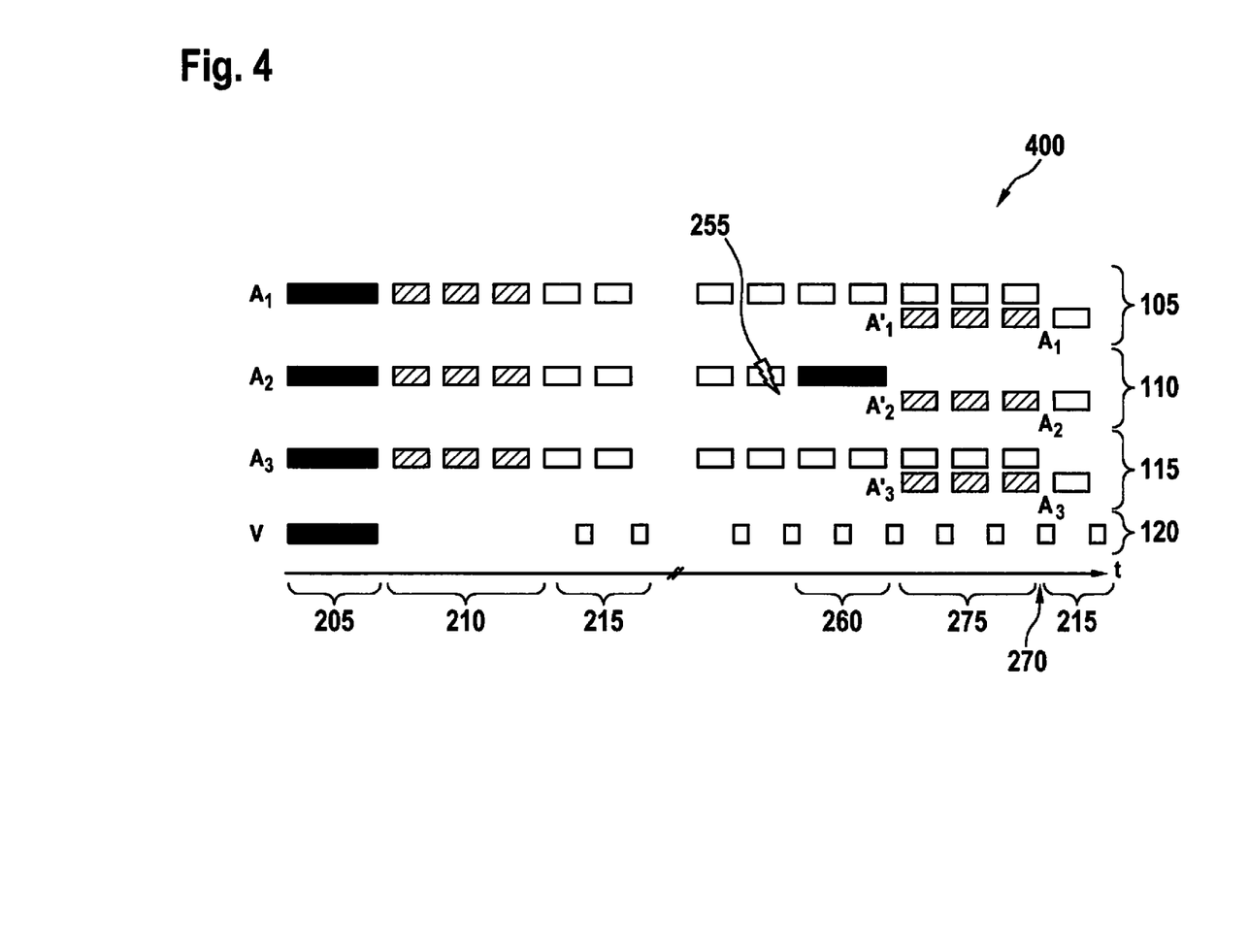
FIG. 4 is an execution diagram of a third method.

FIGS. 2 to 4 are all depicted in the same manner. A time t is plotted in a horizontal direction; in a vertical direction, processing processes A1 to A3 and comparison process V are depicted one above another as bars. The bars that are depicted are interrupted in order to indicate when the respective process A1 to A3, V is executing and when not. The depiction is merely exemplary and figurative. A black bar indicates in each case that the underlying processing device 105 to 115 is being restarted. This operation is known in conjunction with computers as "booting," and can encompass in particular loading and starting of an operating system on the respective processing device 105 to 115 which controls or enables the execution of processes A1 to A3.

A hatched bar indicates that a processing process A1 to A3 is being initialized. Initialization requires the delivery of input information items 125 over a certain time period or a certain number of measurement epochs. Filters, parameters, or a model that can be encompassed by processing processes A1 to A3 can be constructed or stabilized on the basis of input information items 125 that are delivered. For example, processing processes A1 to A3 can encompass a Kalman filter that operates substantially recursively and supplies usable results only after a number of input information items 125. A bar depicted in white represents a usual execution of a processing process A1 to A3. If more than one processing process A1 to A3 is running on a processing device 105 to 115, the most recently started processing process is provided with an apostrophe and labeled A'1 to A'3. If one of processing processes A1 to A3 executing on the same processing device 105 to 115 then terminates, the remaining processing process is then automatically labeled A1 to A3 (without an apostrophe).

FIG. 2 is an execution diagram of a first method 200 for controlling a processing system 100 according to FIG. 1. Processing and comparison devices 105 to 120 may be restarted (booted) in a first step 205. Processing processes A1 to A3 are then initialized on processing devices 105 to 115 in a step 210. A usual execution of processing processes A1 to A3 then occurs in a step 215. In a step 220, new processing processes A'1 to A'3 are respectively started on all processing devices 105 to 115, and run concurrently with processing processes A1 to A3.

In a step 225, the restarted processing processes A'1 to A'3 are initialized, while at the same time processing processes A1 to A3 run normally and furnish information processed on the basis of input information items 125. Once the new processing processes A'1 to A'3 have been completely initialized, they then replace processing processes A1 to A3 in a step 230. The restarted processing processes A'1 to A'3 become processing processes A1 to A3, and method 200 can continue in step 215.

FIG. 3 shows a second method 300 for controlling processing system 100 of FIG. 1. It is assumed in the depiction that steps 205 and 210 have already been carried out. The depiction begins with step 215, in which processing processes A1 to A3 are carried out normally on the associated processing devices 105 to 115. In a step 240, new processing processes A'1 to A'3 are started on processing devices 105 to 115 in addition to the existing processing processes A1 to A3, and are initialized in a subsequent step 245. Steps 240 and 245 correspond substantially to steps 220 and 225 of method 200 of FIG. 2. A switchover from processing processes A1 to A3 to the new processing processes A'1 to A'3 does not then occur, however, but instead the restarted processing process A'1 to A'3 run in the background or are set aside while, in step 250, normal processing corresponding to step 215 is carried out.

If a defective embodiment 255 is determined (in the depiction, second processing process A2), the associated processing device 110 is then restarted in a step 260 (cf. step 205). In a step 265, a processing process A'2 is then started and initialized on the restarted processing device 110. In a step 270, the respective current processing process A1, A3 on processing devices 105, 115 that were not affected by fault 255 is replaced by processing process A'1, A'3 that was subsequently started. Processing can then occur again as in step 215.

FIG. 4 is an execution diagram of a third method 400 for controlling processing system 100 of FIG. 1. Steps 205, 210, and 215 described above are carried out until a fault 255, which here once again, by way of example, affects the second processing process A2 on second processing device 110, is identified. Second processing device 110 that is affected is then restarted in a step 260. In a step 275, new processing processes A'1 to A'3 are then started on all processing devices 105 to 115. In a step 270, operation can then switch over to the restarted processing processes A'1 to A'3, and normal execution operation can be resumed in step 215.

What is claimed is:

1. A method for controlling a processing system, including a plurality of processing devices and a comparison device, the method comprising:
    processing identical information items by the processing devices using associated processing processes;
    furnishing a characteristic value of each of the processing processes, respectively, as a function of the processing that has occurred; and
    comparing the characteristic values by the comparison device, and determining a defectively operating processing process based on the comparison;
    wherein defectively operating processing processes are replaced by a processing process restarted on each processing device,
    wherein when an initialization is complete, existing processing processes on all of the processing devices are replaced by further processing processes, and
    wherein a further processing process is periodically restarted on each of the processing devices, and the initialization is performed with input information items.

2. A method for controlling a processing system, including a plurality of processing devices and a comparison device, the method comprising:
    processing identical information items by the processing devices using associated processing processes;

furnishing a characteristic value of each of the processing processes, respectively, as a function of the processing that has occurred; and comparing the characteristic values by the comparison device, and determining a defectively operating processing process based on the comparison;

wherein defectively operating processing processes are replaced by a processing process restarted on each processing device, and wherein a further processing process is restarted on each of the processing devices and initialized with input information items, wherein a processing device on which the defectively operating processing process is running is reset, wherein a processing process is restarted on each processing device and is initialized with input information items, and wherein existing processing processes on other ones of the processing devices are replaced by further processing processes.

3. A method for controlling a processing system, including a plurality of processing devices and a comparison device, the method comprising:

processing identical information items by the processing devices using associated processing processes;

furnishing a characteristic value of each of the processing processes, respectively, as a function of the processing that has occurred; and comparing the characteristic values by the comparison device, and determining a defectively operating processing process based on the comparison;

wherein defectively operating processing processes are replaced by a processing process restarted on each processing device, and wherein the processing device on which the defectively operating processing process is running is reset, wherein a processing process is restarted on each processing device and initialized with input information items, wherein on each of other ones of the processing devices, a further processing process is respectively restarted and initialized with the input information items, and wherein existing processing processes on the other ones of the processing devices are replaced with further processing processes.

4. A method for controlling a processing system, including a plurality of processing devices and a comparison device, the method comprising:

processing identical information items by the processing devices using associated processing processes;

furnishing a characteristic value of each of the processing processes, respectively, as a function of the processing that has occurred; and comparing the characteristic values by the comparison device, and determining a defectively operating processing process based on the comparison;

wherein defectively operating processing processes are replaced by a processing process restarted on each processing device, wherein when an initialization is complete, existing processing processes on all of the processing devices are replaced by further processing processes, wherein a further processing process is periodically restarted on each of the processing devices, and the initialization is performed with input information items, and wherein the processing processes of at least two processing devices are identical.

5. A method for controlling a processing system, including a plurality of processing devices and a comparison device, the method comprising:

processing identical information items by the processing devices using associated processing processes;

furnishing a characteristic value of each of the processing processes, respectively, as a function of the processing that has occurred; and comparing the characteristic values by the comparison device, and determining a defectively operating processing process based on the comparison;

wherein defectively operating processing processes are replaced by a processing process restarted on each processing device, wherein when an initialization is complete, existing processing processes on all of the processing devices are replaced by further processing processes, wherein a further processing process is periodically restarted on each of the processing devices, and the initialization is performed with input information items, and wherein at least three processing processes are provided and a processing process is determined to be operating defectively if its characteristic value differs from the characteristic values of other ones of the processing devices and other characteristic values are in agreement.

6. A non-transitory computer readable medium having a computer program, which is executable by a processor, comprising:

a program code arrangement having program code for controlling a processing system, including a plurality of processing devices and a comparison device, by performing the following:

processing identical information items by the processing devices using associated processing processes;

furnishing a characteristic value of each of the processing processes, respectively, as a function of the processing that has occurred; and comparing the characteristic values by the comparison device, and determining a defectively operating processing process based on the comparison;

wherein defectively operating processing processes are replaced by a processing process restarted on each processing device, wherein when an initialization is complete, existing processing processes on all of the processing devices are replaced by further processing processes, wherein a further processing process is periodically restarted on each of the processing devices, and the initialization is performed with input information items, and wherein at least two of the processing devices are of identical construction.

7. A processing system, comprising:

a plurality of processing devices, each being configured to process same input information items respectively using an associated processing process and to furnish a characteristic value as a function of a processing; and a comparison device to compare the characteristic values and to determine a defectively operating processing process based on the comparison;

wherein each of the processing devices is configured to replace a processing process executing on it with a restarted processing process if the processing process executing on each processing device has been determined to be operating defectively, wherein when an initialization is complete, existing processing processes on all of the processing devices are replaced by further processing processes,
wherein a further processing process is periodically restarted on each of the processing devices, and the initialization is performed with input information items, and
wherein at least two of the processing devices are of identical construction.

* * * * *